(12) United States Patent
Sugata

(10) Patent No.: US 11,466,759 B2
(45) Date of Patent: Oct. 11, 2022

(54) CYCLOID TRANSMISSION

(71) Applicant: TOYOTA JIDOSHA KABUSHIKI KAISHA, Toyota (JP)

(72) Inventor: Hikaru Sugata, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/553,300

(22) Filed: Dec. 16, 2021

(65) Prior Publication Data

US 2022/0196123 A1 Jun. 23, 2022

(30) Foreign Application Priority Data

Dec. 22, 2020 (JP) .............................. JP2020-212176

(51) Int. Cl.
*F16H 13/08* (2006.01)
(52) U.S. Cl.
CPC .................... *F16H 13/08* (2013.01)
(58) Field of Classification Search
CPC ..................................................... F16H 13/08
See application file for complete search history.

(56) References Cited

U.S. PATENT DOCUMENTS

| | | | |
|---|---|---|---|
| 10,184,547 B2* | 1/2019 | Fecko | F16H 3/70 |
| 11,292,125 B2* | 4/2022 | Tan | B25J 9/102 |
| 2018/0320759 A1* | 11/2018 | Tsai | F16H 55/34 |

FOREIGN PATENT DOCUMENTS

JP 6554573 B2 7/2019

* cited by examiner

*Primary Examiner* — Derek D Knight
(74) *Attorney, Agent, or Firm* — Dinsmore & Shohl LLP

(57) ABSTRACT

In a cycloid transmission a second input side eccentric cam and a first output side eccentric cam are integrally fixed to a rotary shaft to be eccentric in the same phase, a first input side eccentric cam is fixed to the rotary shaft so that the first input side eccentric cam is eccentric in a phase different from that of the second input side eccentric cam and that of the first output side eccentric cam, a second output side eccentric cam is rotatably attached to the rotary shaft, a second input side cycloid gear and a first output side cycloid gear are integrally formed to be rotated in synchronism with each other in the same phase, and a first input side cycloid gear is connected to the second output side cycloid gear by a connection member to be rotated in synchronism with each other in the same phase.

3 Claims, 7 Drawing Sheets

CYCLOID TRANSMISSION

CROSS REFERENCE TO RELATED APPLICATIONS

This application is based upon and claims the benefit of priority from Japanese patent application No. 2020-212176, filed on Dec. 22, 2020, the disclosure of which is incorporated herein in its entirety by reference.

BACKGROUND

The present disclosure relates to a cycloid transmission.

There is known a cycloid transmission including a rotary shaft, first to fourth eccentric cams attached adjacent to each other to the rotary shaft and eccentric in a radial direction by rotation of the rotary shaft, first to fourth cycloid gears attached outside the respective first to fourth eccentric cams and including a plurality of external teeth formed on an outer periphery thereof, an input side rotation part including a plurality of rollers being rotated in contact with the external teeth of the first and second cycloid gears on an inner periphery, and an output side rotation part including a plurality of rollers being rotated in contact with the external teeth of third and fourth cycloid gears on an inner periphery (see, for example, Japanese Patent No. 06554578).

SUMMARY

In the above cycloid transmission, the four eccentric cams are fixed to the rotary shaft at predetermined phases. However, it is difficult to machine and assemble each eccentric cam to the rotary shaft in a strictly predetermined phase. In practice, when each eccentric cam is machined and assembled to the rotary shaft, a phase shift may occur. This phase shift causes noise and backlash in the cycloid transmission.

The present disclosure has been made to solve such a problem and a main object is to provide a cycloid transmission capable of preventing or minimizing generation of noise and backlash.

An example aspect of the present disclosure to achieve the above object is a cycloid transmission including:

a rotary shaft;

first and second input side eccentric cams attached adjacent to each other to the rotary shaft and configured to be rotated eccentrically in a radial direction by rotation of the rotary shaft;

first and second output side eccentric cams attached, to the rotary shaft, adjacent to the first and second input side eccentric cams and configured to be rotated eccentrically in the radial direction by the rotation of the rotary shaft;

first and second input side cycloid gears adjacent to each other, attached to outside of the first and second input side eccentric cams, respectively, and including a plurality of external teeth each including a cycloid curve formed on an outer periphery thereof;

first and second output side cycloid gears adjacent to the first and second input side cycloid gears, attached to outside of the first and second output side eccentric cams, respectively, and including a plurality of external teeth each including a cycloid curve formed on an outer periphery thereof;

a fixed input side rotation part including, on an inner periphery, a plurality of rollers configured to be rotated in contact with the external teeth of the first and second input side cycloid gears; and an output side rotation part including, on an inner periphery, a plurality of rollers configured to be rotated in contact with the external teeth of the first and second input side cycloid gears and are rotated by the rotation of the rotary shaft.

The second input side eccentric cam and the first output side eccentric cam are integrally fixed to the rotary shaft in such a way that the second input side eccentric cam and the first output side eccentric cam are eccentric in the same phase, the first input side eccentric cam is fixed to the rotary shaft in such a way that the first input side eccentric cam is eccentric in a phase different from that of the second input side eccentric cam and that of the first output side eccentric cam, the second output side eccentric cam is rotatably attached to the rotary shaft, the second input side cycloid gear and the first output side cycloid gear are integrally formed in such a way that the second input side cycloid gear and the first output side cycloid gear are rotated in synchronism with each other in the same phase, and the first input side cycloid gear is connected to the second output side cycloid gear by a connection member in such a way that the first input side cycloid gear and the second output side cycloid gear are rotated in synchronism with each other in the same phase.

Another example aspect of the present disclosure to achieve the above object may be a cycloid transmission including:

a rotary shaft;

first and second input side eccentric cams attached adjacent to each other to the rotary shaft and configured to be rotated eccentrically in a radial direction by rotation of the rotary shaft;

first and second output side eccentric cams attached, to the rotary shaft, adjacent to the first and second input side eccentric cams and configured to be rotated eccentrically in the radial direction by the rotation of the rotary shaft;

first and second input side cycloid gears adjacent to each other, attached to outside of the first and second input side eccentric cams, respectively, and including a plurality of external teeth each including a cycloid curve formed on an outer periphery thereof;

first and second output side cycloid gears adjacent to the first and second input side cycloid gears, attached to outside of the first and second output side eccentric cams, respectively, and including a plurality of external teeth each including a cycloid curve formed on an outer periphery thereof;

a fixed input side rotation part including, on an inner periphery, a plurality of rollers configured to be rotated in contact with the external teeth of the first and second input side cycloid gears; and an output side rotation part including, on an inner periphery, a plurality of rollers configured to be rotated in contact with the external teeth of the first and second input side cycloid gears and are rotated by the rotation of the rotary shaft.

The first and second input side eccentric cams are fixed to the rotary shaft in such a way that the first and second input side eccentric cams are eccentric in phases different from each other, the first and second output side eccentric cams are rotatably attached to the rotary shaft, the first input side cycloid gear is connected to the first output side cycloid gear by a connection member in such a way that the first input side cycloid gear and the first output side cycloid gear are rotated in synchronism with each other in the same phase, and the second input side cycloid gear is connected to the second output side cycloid gear by a connection member in such a way that the second input side cycloid gear and the second output side cycloid gear are rotated in synchronism with each other in the same phase.

In this example aspect, the cycloid transmission may further include:

a third input side eccentric cam attached, to the rotary shaft, adjacent to the first and second input side eccentric cams and configured to be rotated eccentrically in the radial direction by the rotation of the rotary shaft;

a third output side eccentric cam attached, to the rotary shaft, adjacent to the first and second output side eccentric cams and configured to be rotated eccentrically in the radial direction by the rotation of the rotary shaft;

a third input side cycloid gear adjacent to the first and second input cycloid gears, attached to outside of the third input side eccentric cam, and including a plurality of external teeth each including a cycloid curve formed on an outer periphery thereof; and a third output side cycloid gear adjacent to the first and second output side cycloid gears, attached to outside of the third output side eccentric cam, and including a plurality of external teeth each including a cycloid curve formed on an outer periphery thereof.

The rollers of the input side rotation part are rotated in contact with the external teeth of the third input side cycloid gear, the rollers of the output side rotation part are rotated in contact with the external teeth of the third output side cycloid gear, the third input side eccentric cam is fixed to the rotary shaft in such a way that the third input side eccentric cam is eccentric in a phase different from that of the first and second input side eccentric cams, the third output side eccentric cam is rotatably attached to the rotary shaft, and the third input side cycloid gear is connected to the third output side cycloid gear by a connection member in such a way that the third input side cycloid gear and the third output side cycloid gear are rotated in synchronism with each other in the same phase.

According to the present disclosure, it is possible to provide a cycloid transmission capable of preventing or minimizing generation of noise and backlash.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Figure 1:
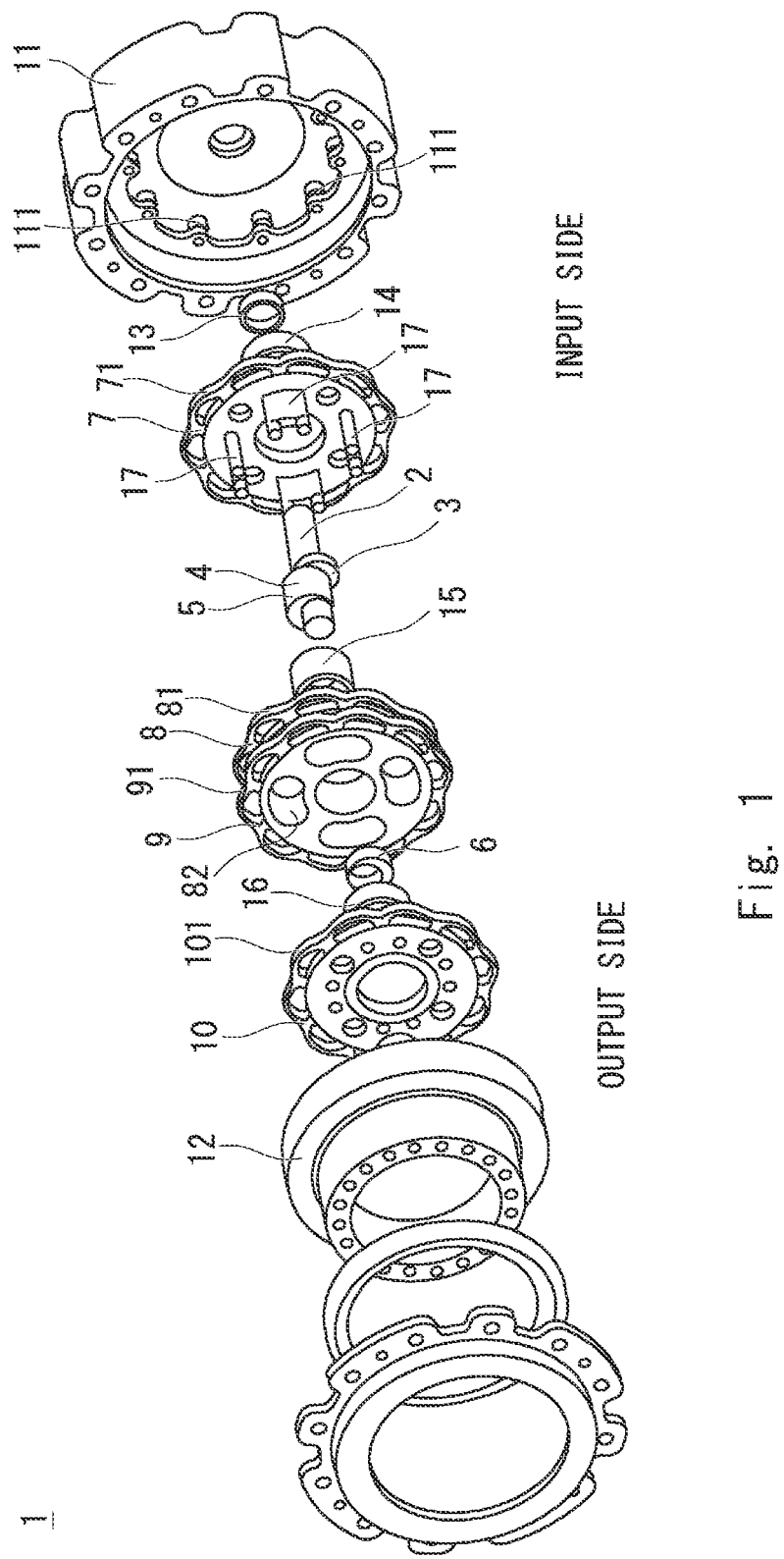
FIG. 1 is an exploded perspective view of a cycloid transmission according to a first embodiment.

Embodiments of the present disclosure will be described below with reference to the drawings. FIG. 1 is an exploded perspective view of a cycloid transmission according to a first embodiment. A cycloid transmission 1 according to the first embodiment is applied to, for example, a transmission of a robot, an automobile, a machine tool or the like.

The cycloid transmission 1 includes a rotary shaft 2, a first input side eccentric cam 3 and a second input side eccentric cam 4 attached to the rotary shaft 2, a first output side eccentric cam 5 and a second output side eccentric cam 6 attached adjacent to the first input side eccentric cam 3 and the second input side eccentric cam 4 to the rotary shaft 2, a first input side cycloid gear 7 and a second input side cycloid gear 8 attached outside the first input side eccentric cam 3 and the second input side eccentric cam 4, first output side cycloid gear 9 and the second output side cycloid gear 10 attached outside the first output side eccentric cam 5 and the second output side eccentric cam 6, an input side rotation part 11 engaged with the first input side cycloid gear 7 and the second input side cycloid gear 8, and an output side rotation part 12 engaged with the first output side cycloid gear 7 and the second output side cycloid gear 8.

Figure 2:
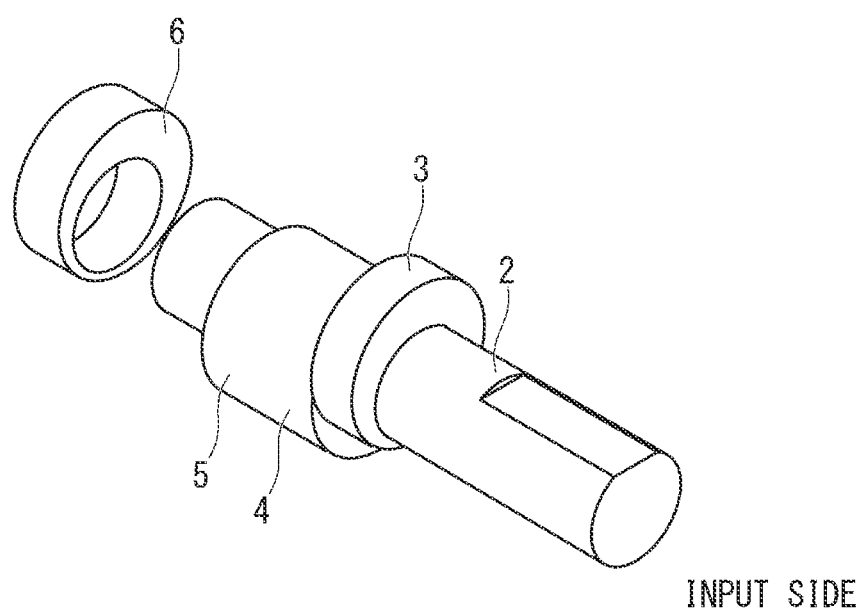
FIG. 2 is an enlarged view of a rotary shaft, first and second input side eccentric cams, and first and second output side eccentric cams according to the first embodiment.

FIG. 2 is an enlarged view of the rotary shaft, the first and second input side eccentric cams, and the first and second output side eccentric cams according to the first embodiment. The rotary shaft 2 is connected to, for example, a driving shaft such as a motor and is rotated by an input torque of the driving shaft. One end of the rotary shaft 2 on the input side is supported by a center part of the input side rotation part 11 with a bearing 13 interposed therebetween (FIG. 1). The bearing 13 is composed of, for example, a ball bearing, a needle bearing, or the like.

The first input side eccentric cam 3, the second input side eccentric cam 4, the first output side eccentric cam 5, and the second output side eccentric cam 6 are attached adjacent to each other in this order to the rotary shaft 2. The first input side eccentric cam 3, the second input side eccentric cam 4, the first output side eccentric cam 5, and the second output side eccentric cam 6 are, for example, cams having the same shape.

The first input side eccentric cam 3 and the second input side eccentric cam 4 are attached adjacent to each other to the rotary shaft 2. The first input side eccentric cam 3 and the second input side eccentric cam 4 are rotated eccentrically in a radial direction by the rotation of the rotary shaft 2. The first output side eccentric cam 5 and the second output side eccentric cam 6 are attached adjacent to the first input side eccentric cam 3 and the second input side eccentric cam 4 to the rotary shaft 2. The first output side eccentric cam 5 and the second output side eccentric cam 6 are rotated eccentrically in a radial direction by the rotation of the rotary shaft 2.

The second input side eccentric cam 4 and the first output side eccentric cam 5 are integrally molded and fixed to the rotary shaft 2. Thus, the second input side eccentric cam 4 and the first output side eccentric cam 5 are integrally rotated eccentrically in the same phase.

The first input side eccentric cam 3 is fixed to the rotary shaft 2 in such a way that the first input side eccentric cam 3 is eccentrically rotated in a phase different from a phase in which the second input side eccentric cam 4 and the first output side eccentric cam 5 are rotated by 180°. The first input side eccentric cam 3 is fixed and attached by inserting, for example, a positioning pin between the first input side eccentric cam 3 and the rotary shaft 2. Similarly, the second input side eccentric cam 4 and the first output side eccentric cam 5 are fixed and attached by inserting, for example, positioning pins between the second input side eccentric cam 4 and the first output side eccentric cam 5 and the rotary shaft 2.

In the first embodiment, the first input side eccentric cam 3, the second input side eccentric cam 4, and the first output side eccentric cam 5 are assembled to the rotary shaft 2, but the present disclosure is not limited to this. At least one of the first input side eccentric cam 3, the second input side eccentric cam 4, and the first output side eccentric cam 5 may be integrally molded with the rotary shaft 2.

The second output side eccentric cam 6 is rotatably attached to the rotary shaft 2. Thus, only the second output side eccentric cam 6 can be freely rotated about the rotary shaft 2.

Figure 3:
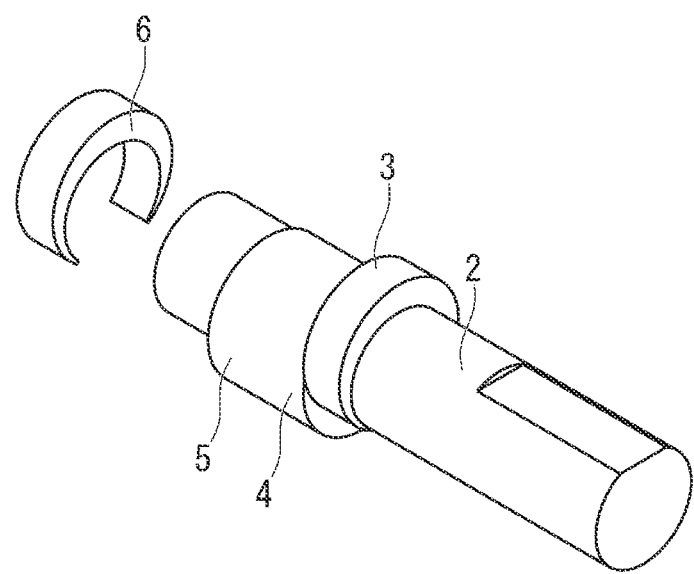
FIG. 3 shows a partially cut off second output side eccentric cam.
Figure 4:
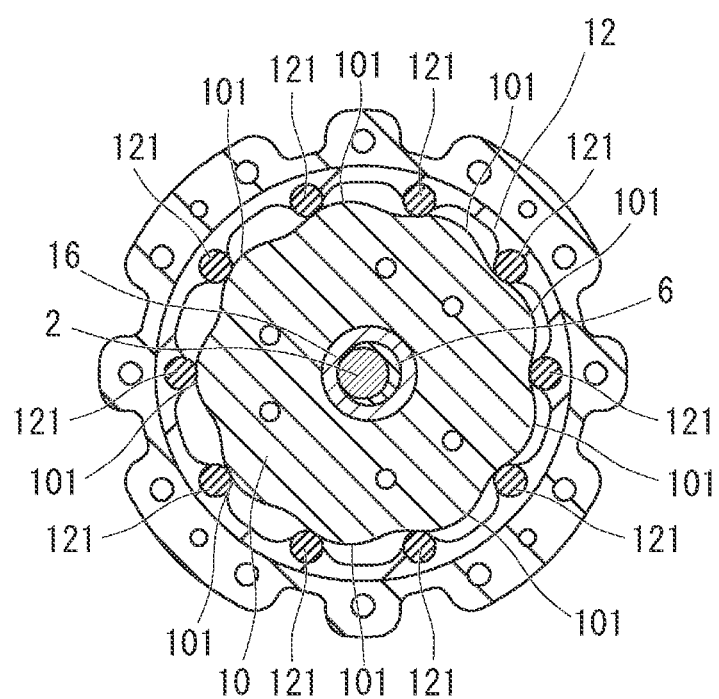
FIG. 4 is a cross-sectional view showing a cross section of an output side rotation part when the output side rotation part is cut perpendicular to a rotary shaft.

The second output side eccentric cam 6 may be formed in such a way that a part of the second output side eccentric cam 6 is cut off, as shown in FIG. 3, in relation to the diameter of the rotary shaft 2, the diameter of the second output side eccentric cam 6, and an eccentric amount. When the eccentric amount of the eccentric cam increases, a thin part may be formed. Since the thin part is easy to break and functionally unnecessary, the part may be chipped as described above.

As shown in FIG. 1, the cycloid transmission 1 according to the first embodiment includes two cycloid gears on the input side and two cycloid gears on the output side. Thus, a load applied to each cycloid gear can be reduced, and durability of the cycloid transmission 1 can be improved.

The first input side cycloid gear 7 is adjacent to the second input side cycloid gear 8. The first input side cycloid gear 7 is attached to the outside of the first input side eccentric cam 3 with a bearing 14 interposed therebetween. Thus, the first input side cycloid gear 7 can be rotated about the first input side eccentric cam 3. On the outside of the first input side cycloid gear 7, a plurality of external teeth 71 of substantially circular arc shapes each including a cycloid curve are formed.

The second input side cycloid gear 8 is attached to the outside of the second input side eccentric cam 4 with a bearing 15 interposed therebetween. Thus, the second input side cycloid gear 8 can be rotated about the second input side eccentric cam 4. On the outside of the second input side cycloid gear 8, a plurality of external teeth 81 of substantially circular arc shapes each including a cycloid curve are formed. The number of external teeth 71 of the first input side cycloid gear 7 and the number of the external teeth 81 of the second input side cycloid gear 8 are the same.

The first output side cycloid gear 9 is adjacent to the second input side cycloid gear 8. The first output side cycloid gear 9 is attached to the outside of the first output side eccentric cam 5 with the bearing 15 interposed therebetween. Thus, the first output side cycloid gear 9 can be rotated about the first output side eccentric cam 5. On the outside of the first output side cycloid gear 9, a plurality of external teeth 91 of substantially circular arc shapes each including a cycloid curve are formed.

The second input side cycloid gear 8 and the first output side cycloid gear 9 are integrally formed. Thus, the second input side cycloid gear 8 and the first output side cycloid gear 9 are eccentrically rotated, in an integrated manner, in the same phase by the second input side eccentric cam 4 and the first output side eccentric cam 5. The number of external teeth of the first output side cycloid gear 9 and the number of external teeth of the second output side cycloid gear 10 are the same.

In each of the integrated second input side cycloid gear 8 and first output side cycloid gear 9, four through holes 82 are formed at equal intervals in a circumferential direction. The number of the through holes 82 formed in each of the second input side cycloid gear 8 and the first output side cycloid gear 9 corresponds to the number of connection members 17 described later and may be any number.

The second output side cycloid gear 10 is adjacent to the first output side cycloid gear 9. The second output side cycloid gear 10 is attached to the outside of the second output side eccentric cam 6 with the bearing 16 interposed therebetween. Thus, the second output side cycloid gear 10 can be rotated about the second output side eccentric cam 6. On the outside of the second output side cycloid gear 10, a plurality of external teeth 101 of substantially circular arc shapes each including a cycloid curve are formed.

The first input side cycloid gear 7 is connected to the second output side cycloid gear 10 by, for example, the four connection members 17. Thus, the first input side cycloid gear 7 and the second output side cycloid gear 10 are rotated in synchronism with each other in the same phase by the first input side eccentric cam 3 and the second output side eccentric cam 6.

The first input side cycloid gear 7 and the second output side cycloid gear 10 may be connected by any number of connection members 17. The connection member 17 is formed as a plate-like member having a thickness in the circumferential direction. Thus, a rotational torque of the first input side cycloid gear 7 can be surely transmitted to the second output side cycloid gear 10.

Protrusions may be formed at both ends of the connection member 17. A recess may be formed in each of the first input side cycloid gear 7 and the second output side cycloid gear 10. The connection members 17 penetrate through the through holes 82 of the integrated second input side cycloid gear 8 and first output side cycloid gear 9. The protrusions at both ends of the connection member 17 are fitted into the recesses of the first input side cycloid gear 7 and the second output side cycloid gear 10, respectively. In this manner, the first input side cycloid gear 7 and the second output side cycloid gear 10 are connected.

The input side rotation part 11 is fixed to a member such as the motor. The input side rotation part 11 is a substantially cylindrical member, and the bearing 13 is attached to the center of the input side rotation part 11. The bearing 13 rotatably supports one end of the rotary shaft 2.

A plurality of rollers 111 being rotated in contact with the external teeth 71 of the first input side cycloid gear 7 and the external teeth 81 of the second input side cycloid gear 8 are provided on an inner periphery of the input side rotation part 11. Each roller 111 is formed in a substantially cylindrical shape and is rotated about its own axis. The rollers 111 are arranged at substantially equal intervals in the circumferential direction of the input side rotation part 11. The number of rollers 111 is, for example, one more than the number of external teeth 71 of the first input side cycloid gear 7 and the number of external teeth 81 of the second input side cycloid gear 8.

The output side rotation part 12 is rotated in accordance with the rotation of the rotary shaft 2. The output side rotation part 12 is a substantially cylindrical member. FIG.

4 is a cross-sectional view showing a cross section of the output side rotation part when the output side rotation part is cut perpendicular to the rotary shaft. A plurality of rollers 121 being rotated in contact with the external teeth 91 of the first output side cycloid gear 9 and the external teeth 101 of the second output side cycloid gear cam 10 are provided on an inner periphery of the output side rotation part 12.

Each roller 121 is formed in a substantially cylindrical shape and rotated about its own axis. The rollers 121 are arranged at substantially equal intervals in the circumferential direction of the output side rotation part 12. The number of rollers 121 is, for example, one more than the number of external teeth 91 of the first output side cycloid gear 9 and the number of external teeth 101 of the second output side cycloid gear 10.

In the cycloid transmission according to the related art, the four eccentric cams are fixed to the rotary shaft at predetermined phases. However, it is difficult to machine and assemble each eccentric cam to the rotary shaft in a strictly predetermined phase. In practice, a phase shift may occur when each eccentric cam is machined and assembled to a rotary shaft. This phase shift causes noise and backlash in the cycloid transmission.

On the other hand, in the cycloid transmission according to the first embodiment, as shown in FIG. 2, the second input side eccentric cam 4 and the first output side eccentric cam 5 are integrally fixed to the rotary shaft 2 in such a way that they are eccentric in the same phase, the first input side eccentric cam 3 is fixed to the rotary shaft 2, and the second output side eccentric cam 6 is rotatably attached to the rotary shaft 2.

Since the second input side eccentric cam 4 and the first output side eccentric cam 5 are integrally fixed to the rotary shaft 2, a phase difference is not generated between the second input side eccentric cam 4 and the first output side eccentric cam 5 which move in synchronism with each other. Further, the first input side eccentric cam 3 is rotated about the rotary shaft 2, and the second output side eccentric cam 6 is rotated about the rotary shaft 2, so that a phase difference is not generated between the first input side eccentric cam 3 and the second output side eccentric cam 6 which move in synchronism with each other. In this way, a phase difference is not generated between the input side and the output side. It is thus possible to prevent or minimize the phase shift, prevent or minimize generation of noise and backlash in the cycloid transmission 1, and thus smoother rotation can be achieved.

Next, a reduction ratio of the cycloid transmission 1 according to the first embodiment will be described in detail.

For example, the number of rollers 111 of the input side rotation part 11 is denoted by N, and the number of rollers 121 of the output side rotation part 12 is denoted by M. The number of rollers 111 of the input side rotation part 11 is one more than the number of external teeth 71 of the first input side cycloid gear 7 and the number of external teeth 81 of the second input side cycloid gear 8. The number of rollers 121 of the output side rotation part 12 is one more than the number of external teeth 91 of the first output side cycloid gear 9 and the number of external teeth 101 of the second output side cycloid gear 10.

In this case, the number of external teeth 71 of the first input side cycloid gear 7 and the number of external teeth 81 of the second input side cycloid gear 8 are (N−1), and the number of external teeth 91 of the first output side cycloid gear 9 and the number of external teeth 101 of the second output side cycloid gear 10 are (M−1). Therefore, a reduction ratio R of the cycloid transmission 1 is (N−1)×M/(N−M).

In order to enhance the effectiveness of the dynamic equilibrium, N and M are even numbers, and N≥2 and M≥2 are satisfied. When N>M and the reduction ratio R is positive, a rotational direction of the output side rotation part 12 and a rotational direction of the rotary shaft 2 are the same. When N<M and the reduction ratio R is negative, the rotational direction of the output side rotation part 12 and the rotational direction of the rotary shaft 2 become opposite.

Next, an operation of the cycloid transmission 1 according to the first embodiment will be described in detail. Here, a case where the rotational direction of the output side rotation part 12 and the rotational direction of the rotary shaft 2 are the same (N>M and the reduction ratio R is positive) will be described.

For example, the rotary shaft 2 receives an input torque from the motor or the like and is rotated in a counterclockwise direction. By the counterclockwise rotation of the rotary shaft 2, the first input side eccentric cam 3 and the second input side eccentric cam 4 and the first output side eccentric cam 5 and the second output side eccentric cam 6 are eccentric in the radial direction and rotated in the counterclockwise direction.

While the first input side eccentric cam 3, the second input side eccentric cam 4, the first output side eccentric cam 5, and the second output side eccentric cam 6 are eccentrically rotated, the first input side cycloid gear 7, the second input side cycloid gear 8, the first output side cycloid gear 9, and the second output side cycloid gear 10 are slowly rotated in a clockwise direction while being eccentric.

By this eccentric rotation, the external teeth 71 of the first input side cycloid gear 7 and the external teeth 81 of the second input side cycloid gear 8 are pressed against the rollers 111 of the input side rotation part 11, and the external teeth 91 of the first output side cycloid gear 9 and the external teeth 101 of the second output side cycloid gear 10 are pressed against the rollers 121 of the output side rotation part 12.

At this time, the rollers 121 of the output side rotation part 12 are rotated in the counterclockwise direction, and the output side rotation part 12 is rotated in the counterclockwise direction. Thus, in the cycloid transmission 1, when the rotary shaft 2 is rotated in the counterclockwise direction as an input rotation, the output side rotation part 12 is rotated in the counterclockwise direction as an output rotation.

Each time the rotary shaft 2 is rotated once, the first input side cycloid gear 7 and the second input side cycloid gear 8 are rotated by one external tooth in the input side rotation part 11 while eccentrically revolving around the rotary shaft 2. The first output side cycloid gear 9 and the second output side cycloid gear 10 are connected to the first input side cycloid gear 7 and the second input side cycloid gear 8, respectively.

Therefore, the first output side cycloid gear 9 and the second output side cycloid gear 10 are also rotated by one external tooth in the output side rotation part 12 while eccentrically revolving around the rotary shaft 2. Thus, the output side rotation part 12 is rotated by the first output side cycloid gear 9 and the second output side cycloid gear 10.

As described above, in the cycloid transmission 1 according to the first embodiment, the second input side eccentric cam 4 and the first output side eccentric cam 5 are integrally fixed to the rotary shaft 2 in such a way that they are eccentric in the same phase. The first input side eccentric cam 3 is fixed to the rotary shaft 2 in such a way that it is eccentric in a phase different from those of the second input side eccentric cam 4 and the first output side eccentric cam 5. The second output side eccentric cam 6 is rotatably attached to the rotary shaft 2. The second input side cycloid gear 8 and the first output side cycloid gear 9 are integrally formed in such a way that they are rotated in synchronism with each other in the same phase. The first input side cycloid gear 7 is connected to the second output side cycloid gear 10 by the connection members 17 in such a way that they are rotated in synchronism with each other in the same phase. In this way, a phase difference is not generated between the input side and the output side. It is thus possible to prevent or minimize the phase shift, and prevent or minimize generation of noise and backlash in the cycloid transmission 1.

Second Embodiment

Figure 5:
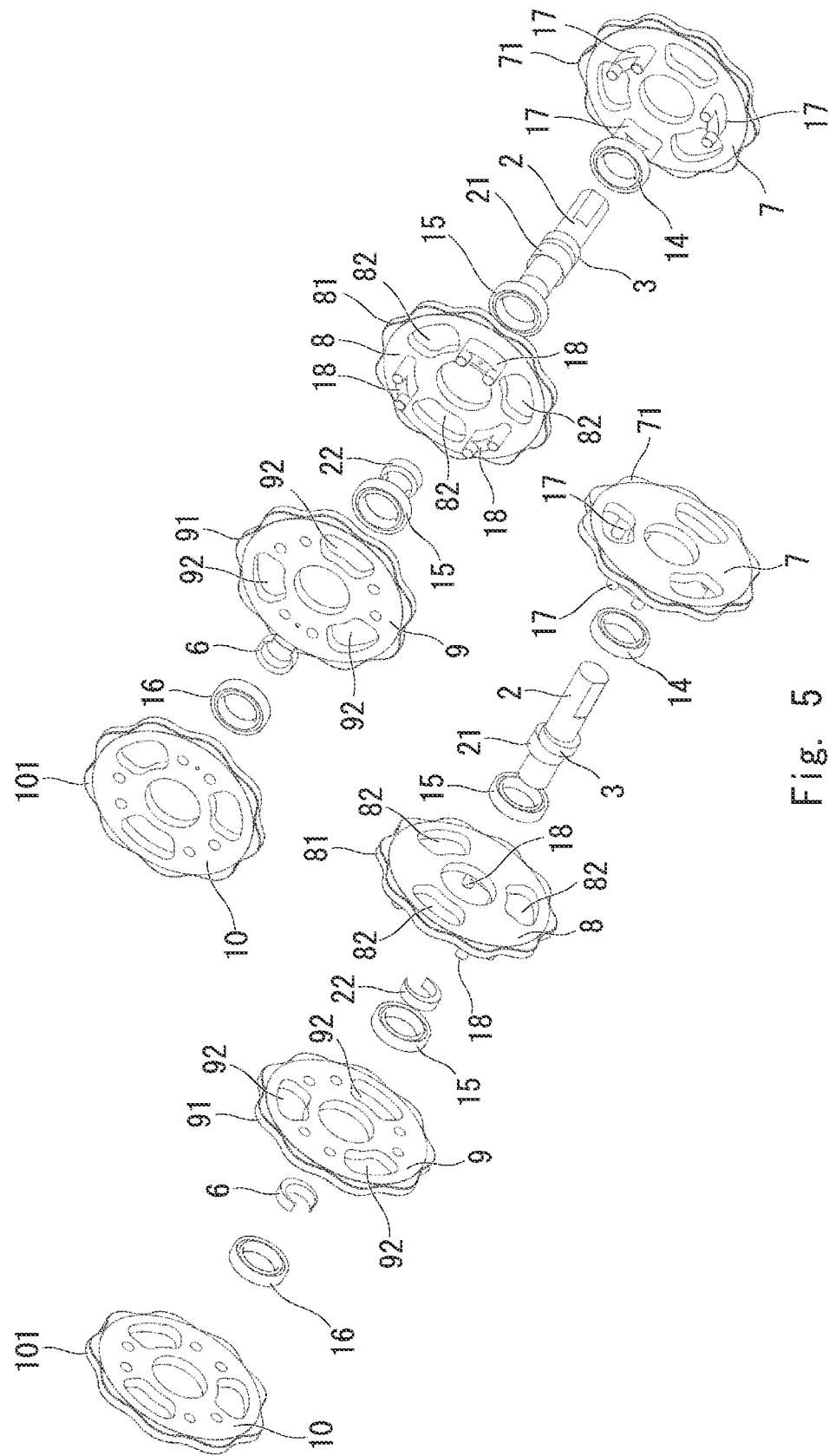
FIG. 5 is an exploded perspective view of a cycloid transmission according to a second embodiment.

FIG. 5 is an exploded perspective view of a cycloid transmission according to a second embodiment. In FIG. 5, upper and lower drawings show the same cycloid transmission seen from different angles. In FIG. 5, the input side rotation part, the output side rotation part, and the like are omitted for easy understanding of the configuration.

As shown in FIG. 5, the first input side eccentric cam 3 and a second input side eccentric cam 21 are fixed to the rotary shaft 2 in such a way that they are eccentric in phases different from each other. The first input side eccentric cam 3 is fixed to the rotary shaft 2 in such a way that they are rotated eccentrically in a phase different from that of the second input side eccentric cam 21, for example, by 180°.

The first output side eccentric cam 22 and the second output side eccentric cam 6 are rotatably attached to the rotary shaft 2. In this way, the first output side eccentric cam 22 and the second output side eccentric cam 6 can be freely rotated about the rotary shaft 2 independently from each other.

Figure 6:
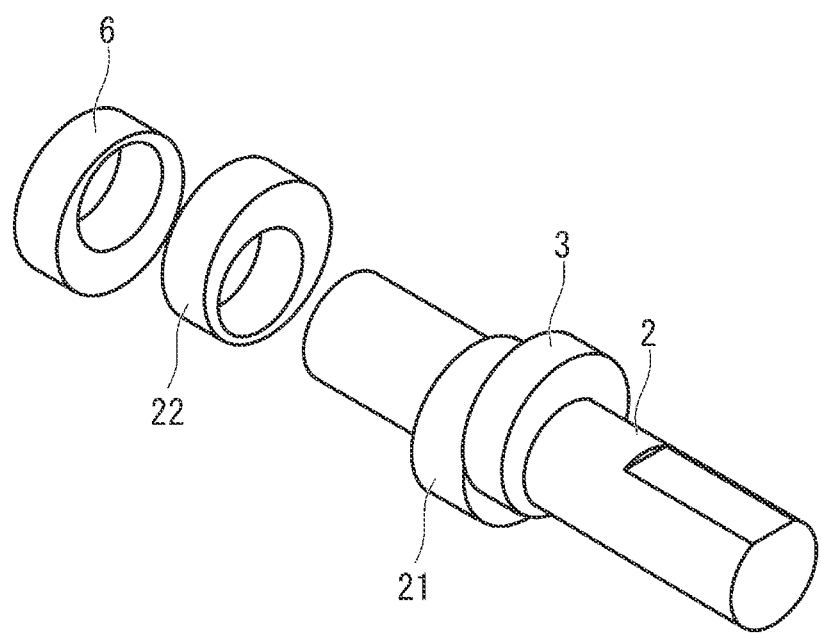
FIG. 6 shows first and second output side eccentric cams which are completely connected.

The first output side eccentric cam 22 and the second output side eccentric cam 6 are formed in such a way that a part of each of the first output side eccentric cam 22 and the second output side eccentric cam 6 is cut off, as shown in FIG. 5, in relation to the diameter of the rotary shaft 2, the diameters of the first output side eccentric cam 22 and the second output side eccentric cam 6, and eccentric amounts. However, as shown in FIG. 6, the first output side eccentric cam 22 and second output side eccentric cam 6 may be formed in such a way that they are completely connected.

As shown in FIG. 5, the first input side cycloid gear 7 is attached to the outside of the first input side eccentric cam 3 with the bearing 14 interposed therebetween. The second input side cycloid gear 8 is attached to the outside of the second input side eccentric cam 21 with the bearing 15 interposed therebetween.

The first input side cycloid gear 7 is connected to the first output side cycloid gear 9 by the connection member 17 in such a way that they are rotated in synchronism with each other in the same phase. The second input side cycloid gear 8 is connected to the second output side cycloid gear 10 by connection members 18 in such a way that they are rotated in synchronism with each other in the same phase.

In the second input side cycloid gear 8, the plurality of through holes 82 are formed in the circumferential direction. The connection members 17 are inserted through the through holes 82 of the second input side cycloid gear 8 to thereby connect the first input side cycloid gear 7 to the first output side cycloid gear 9. The first input side cycloid gear 7 is connected to the first output side cycloid gear 9, for example, three connection members. Thus, the first input side cycloid gear 7 is eccentrically rotated by the first input side eccentric cam 3, and the connection members 17 cause the first output side cycloid gear 9 to be eccentrically rotated.

The first input side cycloid gear 7 may be connected to the first output side cycloid gear 9 by any number of connection members 17. The connection member 17 is formed as a plate-like member having a thickness in the circumferential direction. Thus, the rotational torque of the first input side cycloid gear 7 can be surely transmitted to the first output side cycloid gear 9.

The first output side cycloid gear 9 is attached to the outside of the first output side eccentric cam 22 with the bearing 15 interposed therebetween. The second output side cycloid gear 10 is attached to the outside of the second output side eccentric cam 6 with the bearing 16 interposed therebetween.

In the first output side cycloid gear 9, a plurality of through holes 92 are formed in the circumferential direction. The connection members 18 are inserted through the through holes 92 of the first output side cycloid gear 9 to thereby connect the second input side cycloid gear 8 to the second output side cycloid gear 10.

The second input side cycloid gear 8 is connected to the second output side cycloid gear 10 by, for example, three connection members 18. Thus, the second input side cycloid gear 8 is eccentrically rotated by the second input side eccentric cam 21, and the connection members 18 cause the second output side cycloid gear 10 to be eccentrically rotated.

The second input side cycloid gear 8 may be connected to the second output side cycloid gear 10 by any number of connection members 18. The connection member 18 is formed as a plate-like member having a thickness in the circumferential direction. Thus, the rotational torque of the second input side cycloid gear 8 can be surely transmitted to the second output side cycloid gear 10.

In the second embodiment, the same parts as those in the first embodiment are denoted by the same reference signs, and a detailed description thereof will be omitted.

As described above, according to the cycloid transmission of the second embodiment, the first input side eccentric cam 3 is fixed to the rotary shaft 2, but the first output side eccentric cam 22 is rotated about the rotary shaft 2. Further, the second input side eccentric cam 21 is fixed to the rotary shaft 2, but the second output side eccentric cam 6 is rotated about the rotary shaft 2. Thus, a phase difference is not generated between the two members which move in synchronism with each other. In this way, a phase difference is not generated between the input side and the output side. It is thus possible to prevent or minimize the phase shift, and prevent or minimize generation of noise and backlash in the cycloid transmission 1.

Third Embodiment

A cycloid transmission according to a third embodiment includes three cycloid gears on the input side and three cycloid gears on the output side. Thus, a load applied to each cycloid gear can be further reduced, and the durability of the cycloid transmission can be improved.

Figure 7:
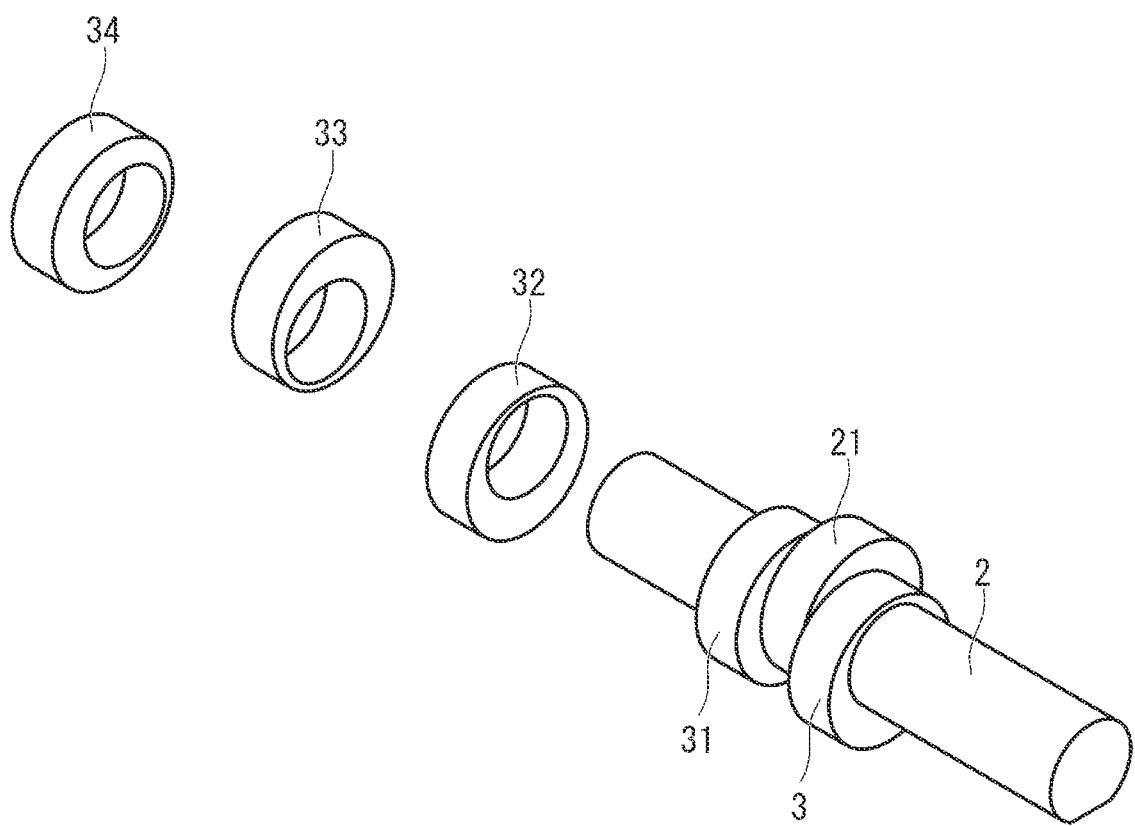
FIG. 7 is an enlarged view of a rotary shaft, first and second input side eccentric cams, and first and second output side eccentric cams according to a third embodiment.

FIG. 7 is an enlarged view of a rotary shaft, first and second input side eccentric cams, and first and second output side eccentric cams according to the third embodiment. As shown in FIG. 7, first to third input side eccentric cams 3, 21, and 31 are fixed to the rotary shaft 2 in such a way that they are eccentric in phases different from each other.

The first input side eccentric cam 3 is fixed to the rotary shaft 2 in such a way that they are rotated eccentrically in a phase different from that of the second input side eccentric cam 4, for example, by 120°. The third input side eccentric cam 31 is fixed to the rotary shaft 2 in such a way that they are rotated eccentrically in a phase different from that of the second input side eccentric cam 4, for example, by 120°. The third input side eccentric cam 31 is eccentrically rotated in a phase different from that of the first input side eccentric cam 3 by 120°.

A first output side eccentric cam 32, a second output side eccentric cam 33, a third output side eccentric cam 34 are rotatably attached to the rotary shaft 2 in this order. Thus, the first output side eccentric cam 32, the second output side eccentric cam 33, the third output side eccentric cam 34 can be freely rotated about the rotary shaft 2 independently from each other.

The first to third input side cycloid gears are attached to the outside of the first to third input side eccentric cams 3, 21, 31, respectively, with bearings interposed therebetween. The first to third output side cycloid gears are attached to the outside of the first output side eccentric cam 32, the second output side eccentric cam 33, the third output side eccentric cam 34, respectively, with bearings interposed therebetween.

The first input side cycloid gear is connected to the first output side cycloid gear by the connection members in such a way that they are rotated in synchronism with each other in the same phase. The second input side cycloid gear is connected to the second output side cycloid gear by the connection members in such a way that they are rotated in synchronism with each other in the same phase. The third input side cycloid gear is connected to the third output side cycloid gear by the connection members in such a way that they are rotated in synchronism with each other in the same phase.

As described above, according to the cycloid transmission of the third embodiment, the first input side eccentric cam 3 is fixed to the rotary shaft 2, but the first output side eccentric cam 32 is rotated about the rotary shaft 2. The second input side eccentric cam 21 is fixed to the rotary shaft 2, and the second output side eccentric cam 33 is rotated about the rotary shaft 2. Further, the third input side eccentric cam 31 is fixed to the rotary shaft 2, but the third output side eccentric cam 34 is rotated about the rotary shaft 2. Thus, a phase difference is not generated between the two members which move in synchronism with each other. In this way, a phase difference is not generated between the input side and the output side. It is thus possible to prevent or minimize the phase shift, and prevent or minimize generation of noise and backlash in the cycloid transmission 1.

In the third embodiment, the same components as those in the above-described embodiments are denoted by the same reference signs, and a detailed description thereof will be omitted.

Although several embodiments of the disclosure have been described, these embodiments are presented by way of example and are not intended to limit the scope of the disclosure. These new embodiments may be implemented in various other forms, and various omissions, substitutions, and modifications may be made without departing from the spirit of the disclosure. These embodiments and modifications thereof are included in the scope and the gist of the disclosure, and are also included in the scope equivalent to the claimed disclosure.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A cycloid transmission comprising:
a rotary shaft;
first and second input side eccentric cams attached adjacent to each other to the rotary shaft and configured to be rotated eccentrically in a radial direction by rotation of the rotary shaft;
first and second output side eccentric cams attached, to the rotary shaft, adjacent to the first and second input side eccentric cams and configured to be rotated eccentrically in the radial direction by the rotation of the rotary shaft;
first and second input side cycloid gears adjacent to each other, attached to outside of the first and second input side eccentric cams, respectively, and including a plurality of external teeth each including a cycloid curve formed on an outer periphery thereof;
first and second output side cycloid gears adjacent to the first and second input side cycloid gears, attached to outside of the first and second output side eccentric cams, respectively, and including a plurality of external teeth each including a cycloid curve formed on an outer periphery thereof;
a fixed input side rotation part including, on an inner periphery, a plurality of rollers configured to be rotated in contact with the external teeth of the first and second input side cycloid gears; and
an output side rotation part including, on an inner periphery, a plurality of rollers configured to be rotated in contact with the external teeth of the first and second input side cycloid gears and are rotated by the rotation of the rotary shaft, wherein
the second input side eccentric cam and the first output side eccentric cam are integrally fixed to the rotary shaft in such a way that the second input side eccentric cam and the first output side eccentric cam are eccentric in the same phase, the first input side eccentric cam is fixed to the rotary shaft in such a way that the first input side eccentric cam is eccentric in a phase different from that of the second input side eccentric cam and that of the first output side eccentric cam, the second output side eccentric cam is rotatably attached to the rotary shaft, the second input side cycloid gear and the first output side cycloid gear are integrally formed in such a way that the second input side cycloid gear and the first output side cycloid gear are rotated in synchronism with each other in the same phase, and the first input side cycloid gear is connected to the second output side cycloid gear by a connection member in such a way that the first input side cycloid gear and the second output side cycloid gear are rotated in synchronism with each other in the same phase.

2. A cycloid transmission comprising:
a rotary shaft;
first and second input side eccentric cams attached adjacent to each other to the rotary shaft and configured to be rotated eccentrically in a radial direction by rotation of the rotary shaft;
first and second output side eccentric cams attached, to the rotary shaft, adjacent to the first and second input side eccentric cams and configured to be rotated eccentrically in the radial direction by the rotation of the rotary shaft;

first and second input side cycloid gears adjacent to each other, attached to outside of the first and second input side eccentric cams, respectively, and including a plurality of external teeth each including a cycloid curve formed on an outer periphery thereof;

first and second output side cycloid gears adjacent to the first and second input side cycloid gears, attached to outside of the first and second output side eccentric cams, respectively, and including a plurality of external teeth each including a cycloid curve formed on an outer periphery thereof;

a fixed input side rotation part including, on an inner periphery, a plurality of rollers configured to be rotated in contact with the external teeth of the first and second input side cycloid gears; and an output side rotation part including, on an inner periphery, a plurality of rollers configured to be rotated in contact with the external teeth of the first and second input side cycloid gears and are rotated by the rotation of the rotary shaft, wherein the first and second input side eccentric cams are fixed to the rotary shaft in such a way that the first and second input side eccentric cams are eccentric in phases different from each other, the first and second output side eccentric cams are rotatably attached to the rotary shaft, the first input side cycloid gear is connected to the first output side cycloid gear by a connection member in such a way that the first input side cycloid gear and the first output side cycloid gear are rotated in synchronism with each other in the same phase, and the second input side cycloid gear is connected to the second output side cycloid gear by a connection member in such a way that the second input side cycloid gear and the second output side cycloid gear are rotated in synchronism with each other in the same phase.

3. The cycloid transmission according to claim 2, further comprising:

a third input side eccentric cam attached, to the rotary shaft, adjacent to the first and second input side eccentric cams and configured to be rotated eccentrically in the radial direction by the rotation of the rotary shaft;

a third output side eccentric cam attached, to the rotary shaft, adjacent to the first and second output side eccentric cams and configured to be rotated eccentrically in the radial direction by the rotation of the rotary shaft;

a third input side cycloid gear adjacent to the first and second input cycloid gears, attached to outside of the third input side eccentric cam, and including a plurality of external teeth each including a cycloid curve formed on an outer periphery thereof; and a third output side cycloid gear adjacent to the first and second output side cycloid gears, attached to outside of the third output side eccentric cam, and including a plurality of external teeth each including a cycloid curve formed on an outer periphery thereof, wherein the rollers of the input side rotation part are rotated in contact with the external teeth of the third input side cycloid gear, the rollers of the output side rotation part are rotated in contact with the external teeth of the third output side cycloid gear, the third input side eccentric cam is fixed to the rotary shaft in such a way that the third input side eccentric cam is eccentric in a phase different from that of the first and second input side eccentric cams, the third output side eccentric cam is rotatably attached to the rotary shaft, and the third input side cycloid gear is connected to the third output side cycloid gear by a connection member in such a way that the third input side cycloid gear and the third output side cycloid gear are rotated in synchronism with each other in the same phase.

\* \* \* \* \*